Oct. 23, 1962  F. A. WETTSTEIN  3,059,937
SEALING DEVICE FOR HYDRAULIC SYSTEMS
Filed Feb. 16, 1960
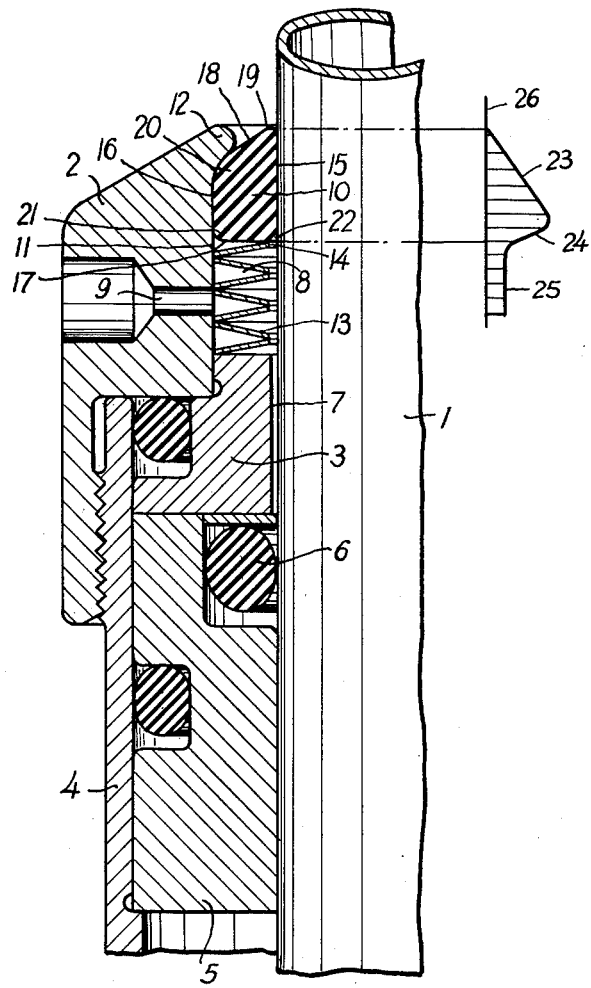
INVENTOR.
Fritz Alexander Wettstein
BY
Pierce, Scheffler & Parker
Attorneys United States Patent Office 3,059,937
Patented Oct. 23, 1962

3,059,937
SEALING DEVICE FOR HYDRAULIC SYSTEMS
Fritz Alexander Wettstein, Goteborg, Sweden, assignor to Aktiebolaget Volvo, Goteborg, Sweden, a corporation of Sweden
Filed Feb. 16, 1960, Ser. No. 8,974
Claims priority, application Sweden Feb. 18, 1959
1 Claim. (Cl. 277—110)

This invention relates to a sealing device for hydraulic systems. The sealing device is of the general type which comprises a sealing ring consisting of an elastic material and adapted to effect a seal between two members which are axially displaceable relative to each other, preferably a reciprocating movement, the sealing ring being attached to one of said members and in sealing engagement with a sliding surface on the other member.

The main purpose of the sealing device according to this invention is to prevent all leakage, and a further important object is to maintain friction and wear at a minimum and to keep the sliding surface as far as possible free from impurities so as to prevent scratching and wear of the sliding surface.

The sealing device according to the invention meets the above requirements in an effective manner, this being attained in accordance with the invention by means of a device which is substantially characterized by the fact that the sealing ring, as viewed in section, is attached to said one member between a spring-loaded support point and another fixed support point, said points being located at different radial distances from the centre of the sealing ring and axially spaced apart such that the ensuing elastic deformation of the sealing ring causes the contact pressure between the sealing ring and the sliding surface to vary in axial direction such as to result in a steep increase of pressure from one side of the ring and a less steep increase of pressure from the other side of the ring.

The packing is formed with well-rounded edges resulting in the formation of a liquid film between the packing ring and the sliding surface during axial movement. If there is an unlimited amount of hydraulic fluid available on both sides of the packing, the thickness of the liquid film depends on the viscosity of the liquid, the relative velocity of movement of the packing and also on the nature of the pressure increase. The steeper the increase of pressure between the packing ring and the sliding surface, the thinner is the liquid film. The invention is based on this fact. If the packing is devised in a manner such that the increase of pressure is steeper upon movement in one direction than upon movement in the other direction, the packing will be able to pump hydraulic fluid from one side of the packing to the other side thereof. In accordance with the invention the packing is so designed that the increase of pressure is steeper upon movement of the packing relative to the sliding surface in the direction from the low-pressure side of the packing to the high-pressure side thereof than upon movement in the opposite direction. As a result, the packing is able to pump hydraulic fluid from the low-pressure side of the packing to the high-pressure side thereof, which means that the packing is absolutely tight in practical operation, since, if hydraulic fluid should collect on the low-pressure side of the packing, such fluid will be pumped back to the high-pressure side. During normal reciprocating movement there never collects any considerable amount of liquid on the low-pressure side of the packing, this being due to the fact that the relatively thin oil film which during movement of the packing relative to the sliding surface in the direction from the low-pressure side of the packing to the high-pressure side thereof is carried along the sliding surface to the low-pressure side of the packing, is permitted, during the subsequent reverse movement, to return immediately to the high-pressure side of the packing. The result is a packing which is absolutely tight and yet operates with a supporting oil film between the packing and the sliding surface. Due to this fact, friction, generation of heat, and wear are reduced to a minimum, resulting in a long life of the packing.

These and other objects and advantages of the invention are explained more closely in the following description of an embodiment of a sealing device exemplified in the annexed drawing and adapted to seal against leakage of oil coming from the low-pressure side of a high-pressure packing.

In the drawing the figure represents a longitudinally sectional view taken substantially centrally through a sealing device constructed in accordance with the invention as well as a pressure diagram showing the distribution of liquid pressure and packing-ring pressure along a piston rod co-operating with the sealing device.

Numeral 1 denotes a piston rod or piston tube which is mounted for displacement in a housing comprising the parts 2, 3, 4 and 5. Oil under pressure can pass through the clearance between the piston rod 1 and the part 5 to a high pressure packing 6. A certain leakage occurs at the high pressure packing, and leaking oil passes through the clearance 7 between the piston rod 1 and the part 3 into a collecting chamber 8 which is sealed at its top by means of a sealing device according to the invention and which also communicates with a return duct 9 in a hydraulic system.

The sealing device according to the invention consists of a sealing ring 10 of an elastic material. The ring 10 is arranged in an annular recess 11 in the part 2 and abuts against a radially inwardly directed shoulder 12 at one end of the recess. Between the sealing ring 10 and the part 3 there is compressed a spring device 13 which consists of a plurality of conical disc springs, so-called Belleville springs. The inner edge 14 of the top disc abuts against the inner end face of the sealing ring near the sliding surface.

The sealing ring has an inner and an outer cylindrical face 15 and 16, respectively, and an inner and outer end face 17 and 18, respectively, the outer end face 18 making an acute angle with the sliding surface. The rounded corners of the ring are denoted 19, 20, 21 and 22.

The pressure curve 23 and 24 against the base line 26 illustrates the variation of the pressure between the packing ring 10 and the piston rod 1. On the outer or low-pressure side of the packing ring 10 atmospheric pressure prevails. On the inner or high-pressure side of the packing ring 10, that is, in the chamber 8, the pressure is represented by the curve at 25. Due to the compression of the packing ring 10 between the shoulder 12 and the inner edge 14 of the spring 13 there is a comparatively steep increase of pressure at the inner edge 22 of the packing ring 10, as represented by the curve at 24. For the same reason, that is, due to the compression of the packing ring 10 between the outer edge 20 and the inner edge 22, the pressure decrease between the packing ring 10 and the piston rod 1 at 23 is less steep, the pressure gradually decreasing toward zero on the outer side of the packing ring 10.

Assuming, for instance, that the piston rod 1 is moving upwards and that there is always leaking oil from the high-pressure packing 6 in the chamber 8, an oil film will be formed between the packing ring 10 and the sliding surface of the piston rod 1 due to the viscosity of the oil and due to the rounded edge 22. The thickness of this oil film depends, in accordance with the general theory of journal-bearings, not only on the viscosity of the oil and the sliding velocity, but also on the increase of pressure per unit of length in the sliding direction. Since this increase of pressure per unit of length is relatively high in accordance with the curve part 24, an oil film of relatively small thickness will be formed in this case. This thin oil film is carried along by the piston rod past the packing ring 10 to the low pressure side. Upon reversal of the movement, the piston rod 1 moves downwards and the oil film is carried along with it. Since now the increase of pressure per unit of length is less, as represented by the curve part 23, the relatively thin oil film will without difficulty be carried along by the piston rod 1 back to the pressure chamber 8. As a matter of fact, a thicker oil film would be formed during this return movement due to the smaller pressure increase per unit of length if a sufficient quantity of oil were supplied from the outside to the sliding surface of the piston rod 1. In this case, the sealing device according to the invention would act as a pump in a manner such that during the reciprocating movement of the piston rod 1 oil would be pumped from the low-pressure side of the packing to the high-pressure side thereof.

However, if no oil is supplied to the piston rod 1 on its low-pressure side, the oil film will return together with the sliding surface of the piston rod 1 from the low-pressure side of the packing to the high-pressure side thereof. Thus a sealing device is obtained which is absolutely fluid-tight and positively prevents all leakage.

Since during relative movement between the packing ring 10 and the piston rod 1 these parts are always separated by a supporting oil film, friction and wear are minimized, resulting in a long life of the sealing device.

In conventional packing designs efforts are made to reduce or prevent leakage by reducing or preventing the formation of a liquid film by means of high sealing pressures or sharp edges at the packing ring. Although leakage may be reduced in this way, this is accomplished at the expense of high friction and wear and short life of the packing.

According to the invention, on the other hand, the formation of a supporting liquid film between the sliding surfaces is facilitated by the use of moderate sealing pressures and well-rounded edges at the packing ring. In this case, the seal is obtained by the previously described construction of the packing ring which controls the thickness of the oil film during opposite directions of movement such as to enable the packing to pump sealing liquid from the low-pressure side of the packing to the high-pressure side thereof.

The ability of the packing to pump liquid from a lower to a higher pressure is obtained, in the example described above, by a resilient load which acts upon the packing ring in such a manner that the packing ring is subjected to a torsional moment which causes the desired distribution of pressure between the packing ring and the piston rod. The same effect can be obtained if the radial thickness of the ring 10 at the inner end of the ring is somewhat greater than the radial depth of the excess 11, or, alternatively, if the recess 11 conically diverges towards the shoulder 12. In both cases, the ring 10 is subjected to a certain radial compression which is highest near the inner end of the ring and lowest at the outer end.

The packing ring 10 also serves as a scraper ring for impurities, such as dust and sand, which are deposited on the piston rod 1. Such impurities will be wiped outward by the packing ring and thus prevented from entering the hydraulic system.

As will be seen from the drawing, the radial width of the shoulder 12 is preferably smaller than half the radial thickness of the packing ring 10, in order to form the above named support point for the packing ring 10 and in order to prevent foreign matter from getting jammed, which might occur if a small clearance only were provided between the shoulder 12 and the piston rod 1.

What I claim is:

A sealing device for a hydraulic system comprising a sealing ring having substantially cylindrical inner and outer surfaces and end surfaces defining inner and outer edges; a first structure having a cylindrical wall and a radially projecting shoulder extending less than half the radial thickness of said sealing ring, said wall and said shoulder being adapted to contact one of said cylindrical surfaces and a first edge, respectively, of said sealing ring; a spring device mounted on the said first structure and adapted to act on the sealing ring substantially at the edge diagonally opposed to said first edge; and a second structure adapted for reciprocating motion relative to the said sealing ring and said first structure, said second structure having a cylindrical surface adapted for sliding contact with the other cylindrical surface of said sealing ring; the device being such that the ensuing elastic deformation of the sealing ring causes the contact pressure between the sealing ring and the sliding surface of said second structure to vary in axial direction such as to result in a steep increase of pressure at that side of the ring on which said spring device is acting and a less steep increase at the other side of the ring.

References Cited in the file of this patent

UNITED STATES PATENTS

| | | |
|---|---|---|
| 1,597,254 | Vogel | Aug. 24, 1926 |
| 2,202,114 | Morf | May 28, 1940 |
| 2,214,038 | Beecher | Sept. 10, 1940 |
| 2,498,802 | Funkhouser | Feb. 28, 1950 |
| 2,745,687 | Stack | May 15, 1956 |
| 2,787,304 | Brundell et al. | Apr. 2, 1957 |
| 2,806,748 | Krotz et al. | Sept. 17, 1957 |
| 2,858,150 | Neher et al. | Oct. 28, 1958 |

FOREIGN PATENTS

| | | |
|---|---|---|
| 545,880 | Germany | Mar. 7, 1932 |